(12) United States Patent
Aznag et al.

(10) Patent No.: US 9,045,113 B2
(45) Date of Patent: Jun. 2, 2015

(54) ATTACHMENT DEVICE FOR CONNECTING A WIPER ARM TO A WIPER BLADE

(75) Inventors: Mohamed Aznag, Scherpendheuvel-Zichem (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 551 days.

(21) Appl. No.: 13/318,883
(22) PCT Filed: Mar. 11, 2010
(86) PCT No.: PCT/EP2010/053075
§ 371 (c)(1),
(2), (4) Date: Jan. 24, 2012
(87) PCT Pub. No.: WO2010/127888
PCT Pub. Date: Nov. 11, 2010

(65) Prior Publication Data
US 2012/0117748 A1  May 17, 2012

(30) Foreign Application Priority Data
May 4, 2009 (DE) .......................... 10 2009 002 783

(51) Int. Cl.
*B60S 1/40* (2006.01)
*B60S 1/38* (2006.01)

(52) U.S. Cl.
CPC ................ *B60S 1/386* (2013.01); *B60S 1/4048* (2013.01); *B60S 1/4045* (2013.01); *Y10T 29/49826* (2015.01); *B60S 1/3868* (2013.01); *B60S 1/40* (2013.01); *B60S 1/4064* (2013.01)

(58) Field of Classification Search
CPC .......... B60S 1/40; B60S 1/386; B60S 1/4064; B60S 1/4045; B60S 1/4048
USPC ............. 15/250.32, 250.31, 250.33, 250.201, 15/250.43, 250.44
See application file for complete search history.

(56) References Cited

U.S. PATENT DOCUMENTS 2,095,396 A * 10/1937 Nielsen ....................... 15/250.32
3,576,044 A * 4/1971 Besnard ...................... 15/250.32
(Continued)

FOREIGN PATENT DOCUMENTS

| CN | 1404450 | 3/2003 |
|---|---|---|
| DE | 10349637 | 6/2005 |

(Continued)

OTHER PUBLICATIONS

PCT/EP2010/053075 International Search Report.

*Primary Examiner* — Monica Carter
*Assistant Examiner* — Michael Jennings
(74) *Attorney, Agent, or Firm* — Michael Best & Friedrich LLP

(57) ABSTRACT

The invention relates to an attachment device (10) for connecting a wiper arm to a wiper blade (12), which is rigidly connected to an attachment element (22) of the attachment device (10), whereas an adapter (60) is connected to the attachment element (22) in an articulated fashion and is detachably fastened to the wiper arm. According to the invention, the attachment element (22) and the adapter (60) are produced from plastic, and the adapter (60) has a longitudinal bar (74) extending along a longitudinal center plane, said bar supporting a bearing pin (76), which runs transverse to the longitudinal direction, in the central region of the bar. Additionally, the longitudinal bar (74) and the bearing pin (76) protrude to a certain extent beyond the side walls (62) of the adapter (60) to the attachment element (22), the part of the longitudinal bar (74) protruding to the attachment part (26) being guided between two contact surfaces (80), which run in the longitudinal direction and are offset in relation to one another so that in the assembled position, each longitudinal side of the longitudinal bar (74) rests against a contact surface (80) and the longitudinal bar (74) can be rotated through an angle of approximately 45° about a vertical axis between the contact surfaces (80). The length of the bearing pin (76) is dimensioned so that in the assembled position, both ends of the pin engage in bearing holes (50) in the side walls (42) of the attachment part (26).

11 Claims, 4 Drawing Sheets

(56) References Cited

U.S. PATENT DOCUMENTS

Figure 1:
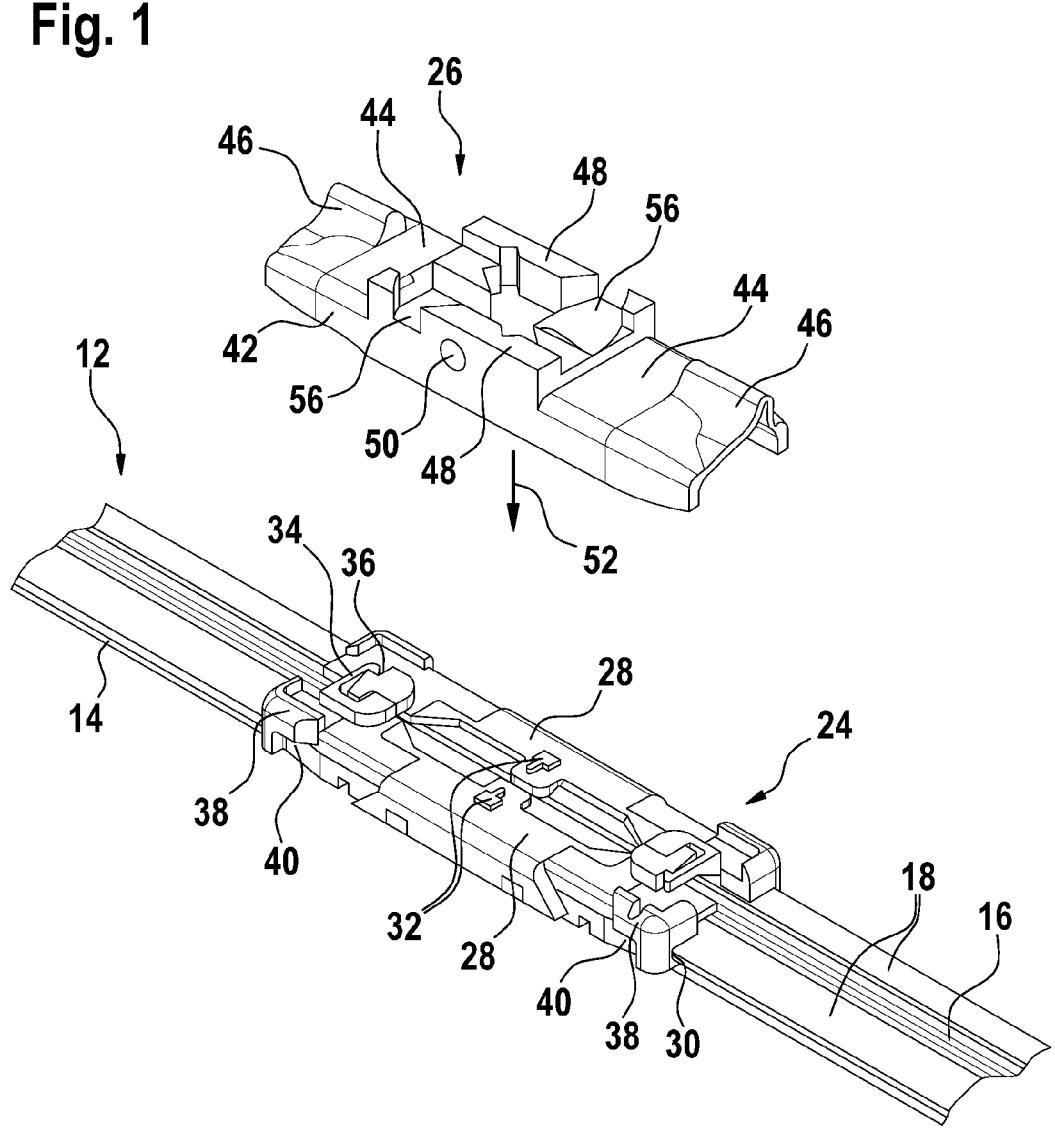

| | | | |
|---|---|---|---|
| 4,069,539 A * | 1/1978 | Klingberg et al. | 15/250.32 |
| 6,178,588 B1 * | 1/2001 | Kotlarski | 15/250.32 |
| 6,363,569 B1 * | 4/2002 | Kotlarski | 15/250.32 |
| 6,449,797 B1 | 9/2002 | De Block | |
| 6,609,267 B1 * | 8/2003 | Journee et al. | 15/250.32 |
| 7,263,741 B2 * | 9/2007 | Genet et al. | 15/250.32 |
| 7,337,489 B2 * | 3/2008 | Huang | 15/250.32 |
| 7,353,562 B2 * | 4/2008 | Huang | 15/250.32 |
| 7,523,522 B2 * | 4/2009 | Herring et al. | 15/250.32 |
| 2006/0248675 A1 * | 11/2006 | Vacher et al. | 15/250.32 |
| 2007/0220698 A1 * | 9/2007 | Huang | 15/250.32 |
| 2008/0148509 A1 * | 6/2008 | Bacarella et al. | 15/250.32 |
| 2009/0113653 A1 | 5/2009 | Thienard | |
| 2009/0151110 A1 * | 6/2009 | Ku | 15/250.32 |

FOREIGN PATENT DOCUMENTS

| | | | |
|---|---|---|---|
| EP | 1847425 | 10/2007 | |
| FR | 2838693 A1 * | 10/2003 | B60S 1/40 |
| JP | 2008542102 | 11/2008 | |
| WO | 0234595 | 5/2002 | |
| WO | WO 0234595 A1 * | 5/2002 | |
| WO | 2008003675 | 1/2008 | |
| WO | WO 2008145481 A1 * | 12/2008 | |

* cited by examiner

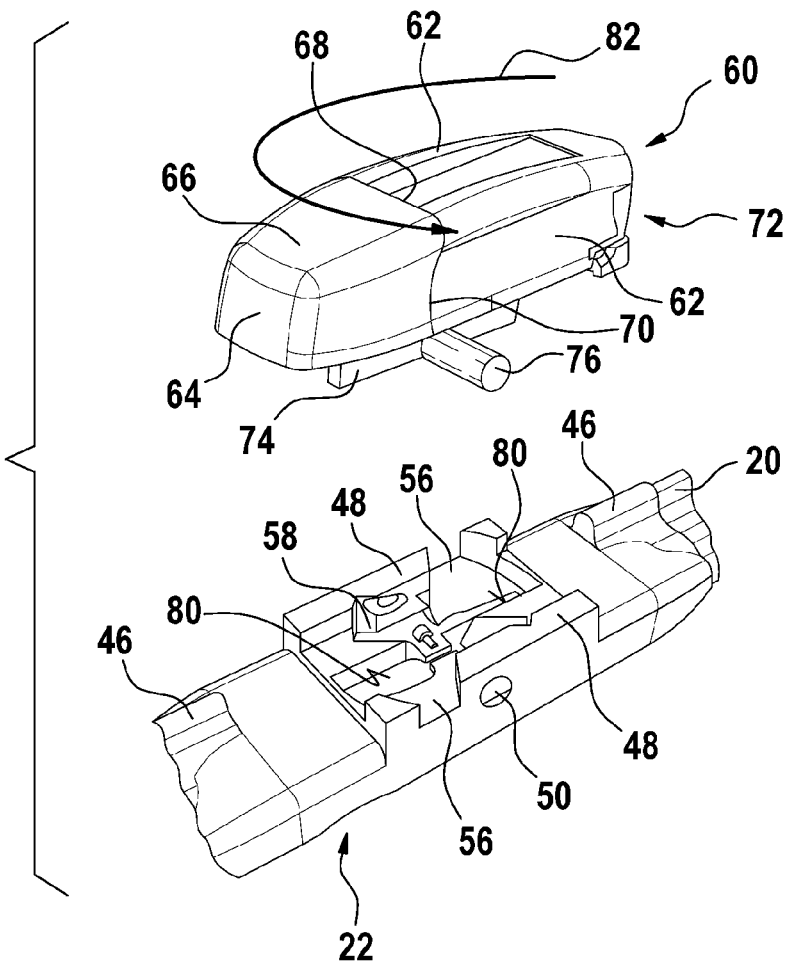
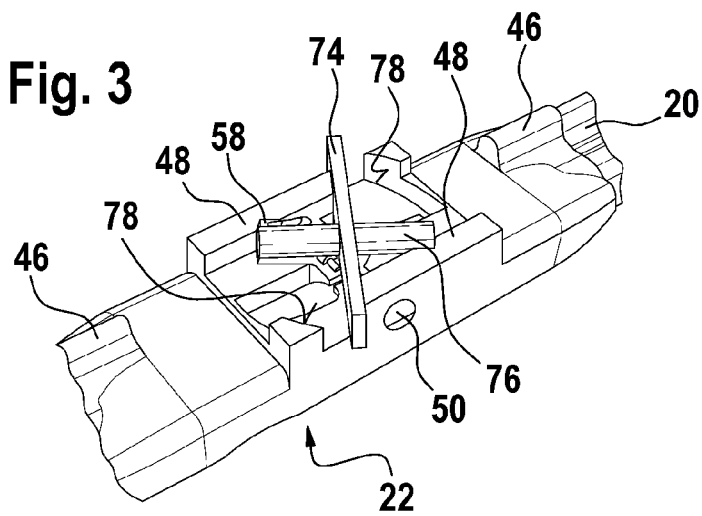

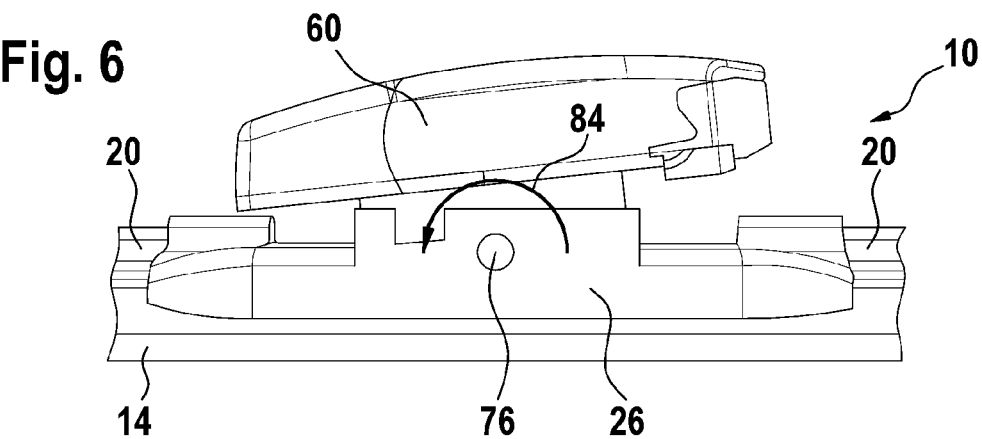
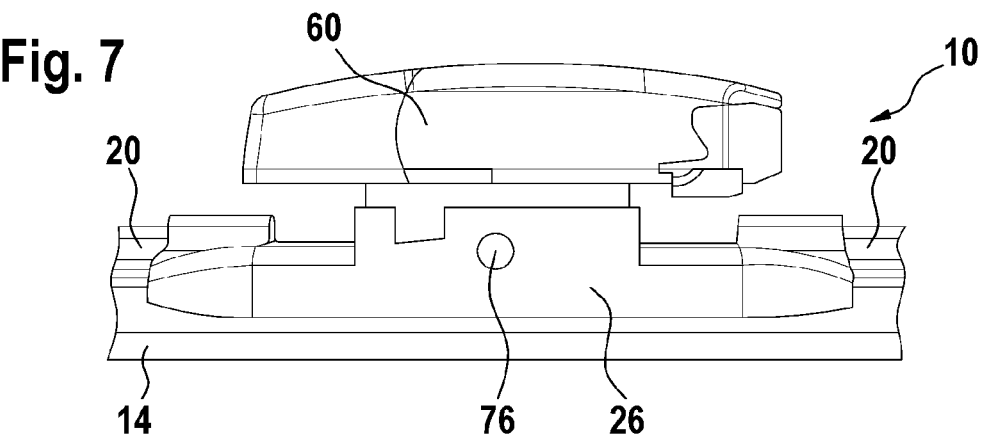
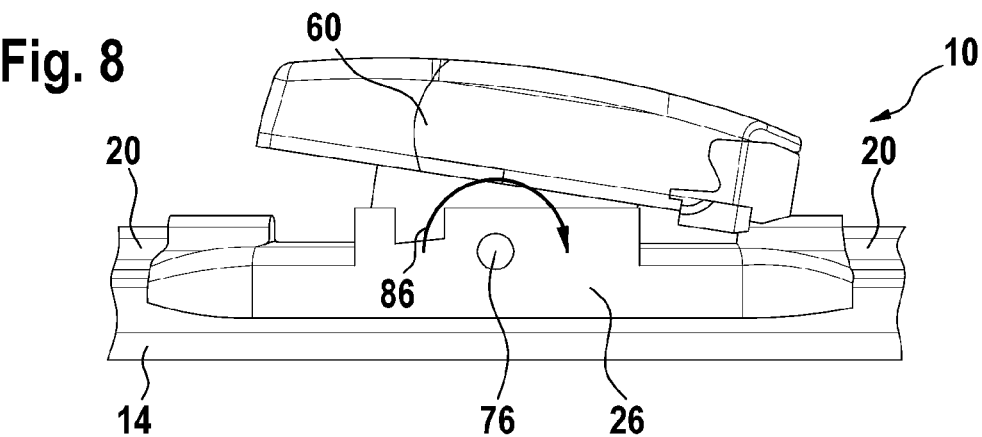

ATTACHMENT DEVICE FOR CONNECTING A WIPER ARM TO A WIPER BLADE

BACKGROUND OF THE INVENTION

The invention relates to an attachment device for connecting to a wiper arm to a wiper blade.

A wiper blade for motor vehicle glass panes, which comprises in an attachment element for the articulated connection to a wiper arm in the central region thereof, is known from the German patent publication DE 10 2006 031 514 A1. The attachment element comprises a base element composed of two side parts having open longitudinal grooves which face each other. The side parts sit with these longitudinal grooves on two flat, ribbon-shaped, pre-bent spring rails, which serve as a carrier element. Said spring rails are partially embedded in lateral longitudinal grooves of a wiper strip and protrude to a certain extent laterally beyond said longitudinal grooves of the wiper strip at least in the region of said attachment element. The longitudinal grooves of the base element are bounded at the bottom by a lower leg and at the top by an upper leg. A projection is disposed in an end region on the upper leg and a recess is disposed in the other end region, which in each case are oriented towards the opposite side part. The projection of the one side part fits into the recess of the other side part and vice versa. In the assembled state, the projections fix the side parts longitudinally relative to one another in the recesses and define the distance of said longitudinal grooves transversely to the wiper blade. Two contact surfaces, which run inclined to the longitudinal direction, are situated in each case on one side of each projection or recess. In so doing, the contact surfaces form a convex roof area at the projection which fits into a concave roof area, which is formed by the contact surfaces at the recesses. Thus, the side parts are locked in the direction of the vertical axis.

A detent hook, which during assembly engages in a detent depression on the projection of the respective other side part of the base element, can be provided on the sides of the recess opposite to the contact surfaces. The projections and the associated recesses comprising the associated contact surfaces and detent hooks form a guide block, which engages in a recess in a base of a sheet metal claw.

The sheet metal claw as the attachment part encompasses the side parts of the base element from the outside with feet, which project in an angled manner from the base of said sheet metal claw toward the wiper lip of the wiper blade. At the ends of said sheet metal claw, longitudinally oriented lugs, which are bent into corresponding recesses of the base element during assembly, are integrally formed on the feet thereof. Starting from the base of said sheet metal claw, side walls are bent in opposite directions at approximately 90 degrees between said feet. The side walls carry a bearing pin as the joint part, which is riveted to said side walls and serves to rotatably support an adapter which can be connected to the wiper arm.

SUMMARY OF THE INVENTION

According to the invention, the attachment element and the adapter are produced from plastic, and the adapter has a longitudinal bar extending along a longitudinal center plane, said bar supporting a bearing pin, which runs transverse to the longitudinal direction, in the central region of the bar. The longitudinal bar and the bearing pin protrude to a certain extent beyond the side walls of the adapter to the attachment element, the part of the longitudinal bar protruding to the attachment part being guided between two contact surfaces, which run in the longitudinal direction and are offset in relation to one another so that in the assembled position, each longitudinal side of said longitudinal bar rests against a contact surface. During assembly, said longitudinal bar can be rotated through an angle α, preferably of approximately 45°, about a vertical axis between the contact surfaces. As a result, the length of the bearing pin is dimensioned so that in the assembled position, both ends of the pin engage in bearing holes in the side walls of the attachment part.

The attachment device according to the invention has a flat and compact construction. Said device is easy to assemble and has a wide range of applications in different types of vehicles. Moreover, said device provides a very good lateral control of the wiper blade.

When using the attachment device according to the invention, the adapter is initially rotated through an angle α of approximately 45° with respect to the wiper blade, is placed onto the attachment element and is then aligned in the longitudinal direction of the wiper blade. In so doing, a joint part of said adapter, preferably in the form of a bearing pin, engages in a joint part of said attachment element, preferably in the form of bearing holes. In order to be able to better coordinate the individual assembly movements, it is advantageous for the longitudinal bar to be radially guided on the end faces thereof through guide surfaces of the attachment part of said attachment element. In so doing, relative movements between said adapter and said attachment element are coordinated in the direction of the vertical axis as well as in the pivoting direction of said adapter. In addition, guide tracks, by which the engagement of the bearing pin in the bearing holes is facilitated, are provided in the pivoting direction on the interior sides of the side walls in front of the bearing holes. The bearing pin can penetrate the longitudinal bar as a pin or also be formed by bearing journals, which are integrally formed on both longitudinal sides of said longitudinal bar.

It is furthermore advantageous for the side walls of the attachment element to be super-elevated with respect to a cover wall in the region of the bearing holes. As a result, the pivot spindle of the adapter can assume a greater distance from the cover wall so that larger pivot angles are possible for a given length of said adapter. By having larger pivot angles of the adapter, the same wiper blade can be used with motor vehicles having very different radii of curvature of the vehicle glass panes. A measure taken along similar lines pertains to an attachment part comprising attachment profiles on the ends thereof for receiving spoilers. The distance of said attachment profiles from one another is to be dimensioned such that the adapter starting from a position approximately parallel to the wiper blade can be pivoted clockwise and in the opposite direction without being obstructed by the adjacent spoiler profiles or attachment profiles.

The attachment element can basically be connected to any kind of carrier element in any known suitable manner. It has however proven to be advantageous for said attachment element to be of multi-piece design and in fact to comprise a base element which is divided into two side parts in the longitudinal direction and has mutually facing, open longitudinal grooves, which encompass a carrier element in the form of a or a plurality of pre-bent, ribbon-shaped spring rail(s). The mutually facing sides of the base element are also connected to one another by detent connections. In addition to the detent connections, the side parts can be laterally held together by the attachment part by means of the side walls of said attachment part engaging via detent bosses situated on the interior sides thereof in recesses on the exterior sides of the side parts.

Additional advantages ensue from the following descriptions of the drawings. An exemplary embodiment of the invention is depicted in said drawings. The drawings, the description and the claims contain numerous features in combination. The specialist in the field will both advantageously consider the features individually and combine them to form useful additional embodiments.

Figure 4:
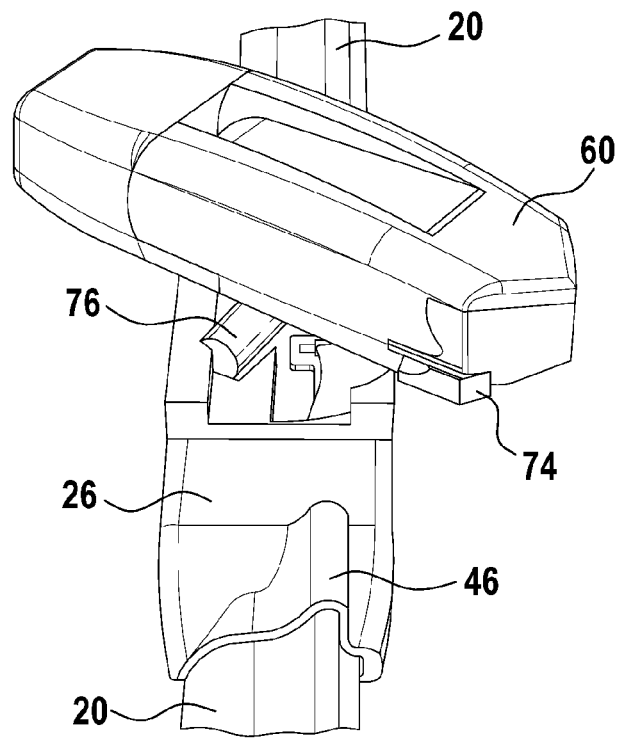
Figure 5:
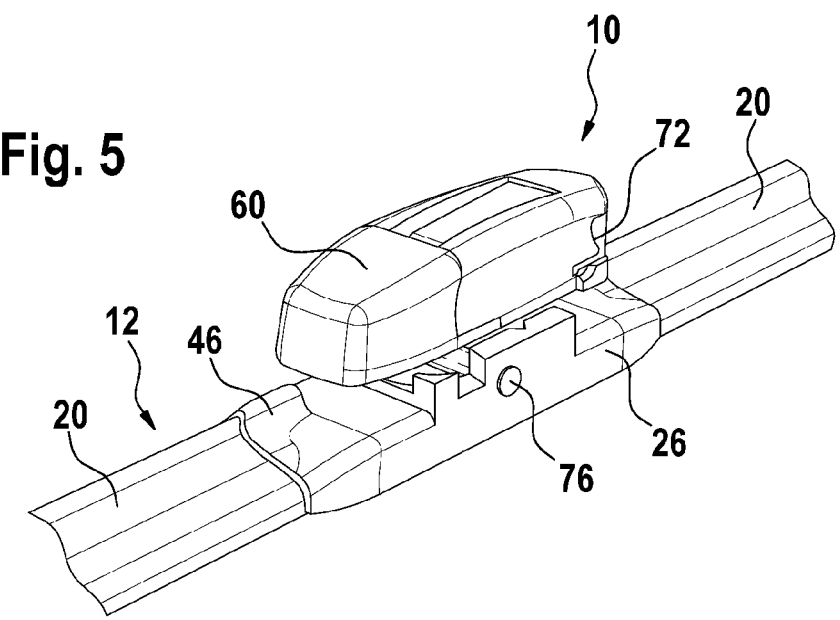

The following are shown:

FIG. 1 a perspective partial view of a wiper blade during the assembly of an attachment part, FIG. 2 a perspective partial view of a wiper blade comprising an assembled attachment element during the assembly of an adapter, FIG. 3 a perspective partial view of a wiper blade comprising an assembled attachment element and a schematic depiction of a longitudinal bar with a bearing pin, FIG. 4 a perspective partial view of a wiper blade comprising an assembled attachment element and an adapter shortly prior to engaging with the bearing pin, FIG. 5 a perspective partial view of a wiper blade comprising an assembled attachment device, FIG. 6 a partial view of a wiper blade from the side comprising an assembled attachment device having an adapter which pivots clockwise, FIG. 7 a partial view of a wiper blade from the side comprising an assembled attachment device having an adapter located in the starting position thereof and FIG. 8 a partial view of a wiper blade from the side comprising an assembled attachment device having an adapter which pivots counterclockwise.

DETAILED DESCRIPTION

A wiper blade 12 according to FIG. 1 comprises a wiper lip 14, which typically is connected to a head strip 16 via a swiveling web. Said wiper lip 14 is held by a carrier element 18 in the form of two ribbon-shaped, pre-bent spring rails. Two side parts 28 of a base element 24 of an attachment element 22 are mounted on the carrier element 18 by said side parts 28, which comprise mutually facing longitudinal grooves 30, encompassing the carrier element at the parts thereof which laterally protrude over the head strip 16. On the mutually facing sides of the side parts 28, said side parts 28 comprise in each case on the ends thereof a detent hook 34 which interacts with a detent depression 36 of the respective other side part 28. Said side parts 28 are held together by means of this detent connection 34, 36. In addition, the cohesion of said side parts 28 is supported by an attachment part 26, which is placed during assembly onto the base element 24 in the mounting direction in the direction of a vertical axis and laterally encompasses said side parts 28 with the side walls 42 thereof. In the process, detent bosses, which are not depicted in detail, engage in recesses 40 below reinforcements 38 of said side parts 20 of the base element 24. Said side parts 28 comprise centering bosses 32, which ensure the relative position of said base element 24 with respect to the attachment part 26, in the central region thereof.

Whereas the base element 24 serves to connect the attachment element 22 to the carrier element 18, the attachment part 26 is provided for the articulated connection of said attachment element 22 to an adapter 60. Both side walls 42 of said attachment part 26 are connected to one another by a cover wall 44, toward the ends of which attachment profiles 46 for spoilers 20 of the wiper blade can connect. The side walls 42 comprise super-elevated parts 48, in which bearing holes 50 are provided, in the central region thereof.

The adapter 60 comprises side walls 62, which are connected to one another by a cover wall 66. The side walls 62 and the cover wall 66 are closed on the front side thereof by an end wall 64. In addition, said cover wall 66 and said side walls 62 respectively comprise a contact edge 68 and contact edges 70, on which connecting elements of the unspecified wiper arm can be supported, on the exterior sides thereof. The connecting elements are fixed between the contact edges 68, 70 and the locking mechanisms 72 at the driving end of the adapter 60. The adapter 60 additionally comprises a longitudinal bar 74 extending along a longitudinal center plane thereof, said bar supporting a bearing pin 76 which runs transverse to the longitudinal direction. The longitudinal bar 74 and the bearing pin 76 protrude to a certain extent beyond the side walls 62 of the adapter 60 to the attachment element 22.

During assembly, the adapter 60 is rotated through an angle of approximately 45° in the direction of rotation 82 relative to the attachment element 22 and is placed onto said attachment element 22 in the direction of a vertical axis. For this purpose, the attachment part 26 has a clearance 56, which on the one side is bounded by end faces of the super-elevated parts 48 of the side walls 42 and on the other side by contact surfaces 80. The contact surfaces 80 run in the longitudinal direction of the wiper blade 12. Said surfaces are offset to one another in the longitudinal direction so that they are separated from one another by the longitudinal bar 74, which in the assembled position rests with a longitudinal side on each of said surfaces. During assembly, the adapter 60 is rotated from the starting position thereof (FIG. 3, FIG. 4) in the opposite direction to the direction of rotation 82 back to the end position thereof (FIG. 2). In so doing, the bearing pin 76 engages in the bearing holes 50 of the attachment part 26. In order to facilitate the engagement, guide tracks 58 are provided in front of said bearing holes 50, on which the end faces of the bearing pin 76 glide along until they engage in said bearing holes 50. Furthermore, the end faces of said longitudinal bar 74 are guided radially onto guide surfaces 78 of said attachment part 26 when said adapter 60 is rotated about the vertical axis. The bearing pin 76 can consist of a pin, which penetrates said longitudinal bar 74. Said bearing pin can however also be formed by bearing journals, which are integrally formed on both sides of said longitudinal bar 74.

FIG. 5 shows a completely assembled device 10. It can be clearly seen that the adapter 60 has an adequate distance to the spoilers 20 and the attachment profiles 46 toward both ends of said device 10; thus enabling a sufficient pivot angle to be provided to said adapter 60, as is shown in FIGS. 6 to 8, starting from a position approximately parallel to the wiper blade 12 (FIG. 7) in the clockwise 86 as well as in the opposite direction 84. All technically essential areas of application of the wiper blade 12 are thereby covered.

The invention claimed is:

1. An attachment device (10) for connecting a wiper arm to a wiper blade (12), which is rigidly connected to an attachment element (22) of the attachment device (10), whereas an adapter (60) is connected to the attachment element (22) in an articulated fashion and is detachably fastened to the wiper arm, characterized in that said attachment element (22) and the adapter (60) are produced from plastic, and said adapter (60) has a longitudinal bar (74) extending along a longitudinal center plane, said bar supporting a bearing pin (76), which runs transverse to a longitudinal direction in a central region of the bar, in that the longitudinal bar (74) and the bearing pin (76) protrude to a certain extent beyond side walls (62) of said adapter (60) to the attachment element (22), a part of said longitudinal bar (74) protruding to an attachment part (26) of the attachment element being guided between two contact surfaces (80), which run in the longitudinal direction and are offset in relation to one another, so that in the assembled position, each longitudinal side of said longitudinal bar (74) rests against one of the contact surfaces (80) and said longitudinal bar (74) can be rotated through an angle α about a vertical axis between the contact surfaces (80) and in that the length of the bearing pin (76) is dimensioned so that in the assembled position, both ends of the pin engage in bearing holes (50) in side walls (42) of the attachment part (26).

2. An attachment device (10) according to claim 1, characterized in that the angle α is approximately 45°.

3. An attachment device (10) according to claim 1, characterized in that the longitudinal bar (74) is radially guided at end faces thereof through guide surfaces (78) of the attachment part (26).

4. An attachment device (10) according to claim 1, characterized in that the side walls (42) of the attachment element (22) are super-elevated in relation to a cover wall (44) in the region of the bearing holes (50).

5. An attachment device (10) according to claim 1, characterized in that guide tracks (58) are provided in a pivoting direction of the adapter on the interior sides of the side walls (42) in front of the bearing holes (50).

6. An attachment device (10) according to claim 1, characterized in that the attachment part (26) has attachment profiles (46) for spoilers (20) on the ends thereof, the distance of said profiles from one another being dimensioned such that the adapter (60) starting from a position approximately parallel to the wiper blade (12) can be pivoted clockwise (86) and in the opposite direction (84).

7. An attachment device (10) according to claim 1, characterized in that the attachment element (22) comprises a base element (24), which is divided into two side parts (28) in the longitudinal direction and encompasses a carrier element (18) with mutually facing longitudinal grooves (30), and in that the two side parts are connected to one another on the mutually facing sides by means of detent connections (34, 36).

8. An attachment device (10) according to claim 7, characterized in that in addition to the detent connections (34, 36), the side parts (28) are laterally held together by the attachment part (26), and in that the side walls (42) of said attachment part (26) engage with detent bosses situated on the interior sides thereof in recesses (40) on the exterior sides of the side parts (28).

9. An attachment device (10) according to claim 1, characterized in that the adapter (60) comprises locking mechanisms (72) for attaching different wiper arms.

10. A wiper blade (12) comprising an attachment device (10) according to claim 1.

11. A method for producing a wiper blade (12) having a wiper lip held by a carrier element, the carrier element defining a plane which is generally parallel to a surface to be wiped by the wiper lip, the method comprising mounting an attachment element on the carrier element, positioning an adapter (60) above an upper side of the attachment element (22) so as to be rotated about a vertical axis with respect to a longitudinal extension of the wiper blade (12), the vertical axis being perpendicular to the plane defined by the carrier element, guiding the adapter in and/or above the attachment element (22), and subsequently rotating the adapter about the vertical axis into a working end position to such an extent that joint parts (76) of the adapter (60) engage with joint parts (50) of said attachment element (22) and create a connection which makes a reciprocating movement of the adapter relative to the attachment element possible, wherein the connection between the adapter and the attachment element makes a reciprocating pivotal movement of the adapter relative to the attachment element possible, wherein the reciprocating pivotal movement of the adapter relative to the attachment element is about a horizontal axis perpendicular to a longitudinal extension of the wiper blade, wherein said adapter has a bearing pin which runs transverse to a longitudinal direction, and a length of the bearing pin is dimensioned so that rotating the adapter about the vertical axis causes opposite ends of the bearing pin to engage in bearing holes in the attachment element, and wherein the bearing pin extends along the horizontal axis when the adapter is in the working end position.

\* \* \* \* \*